2,863,362
Patented Dec. 9, 1958

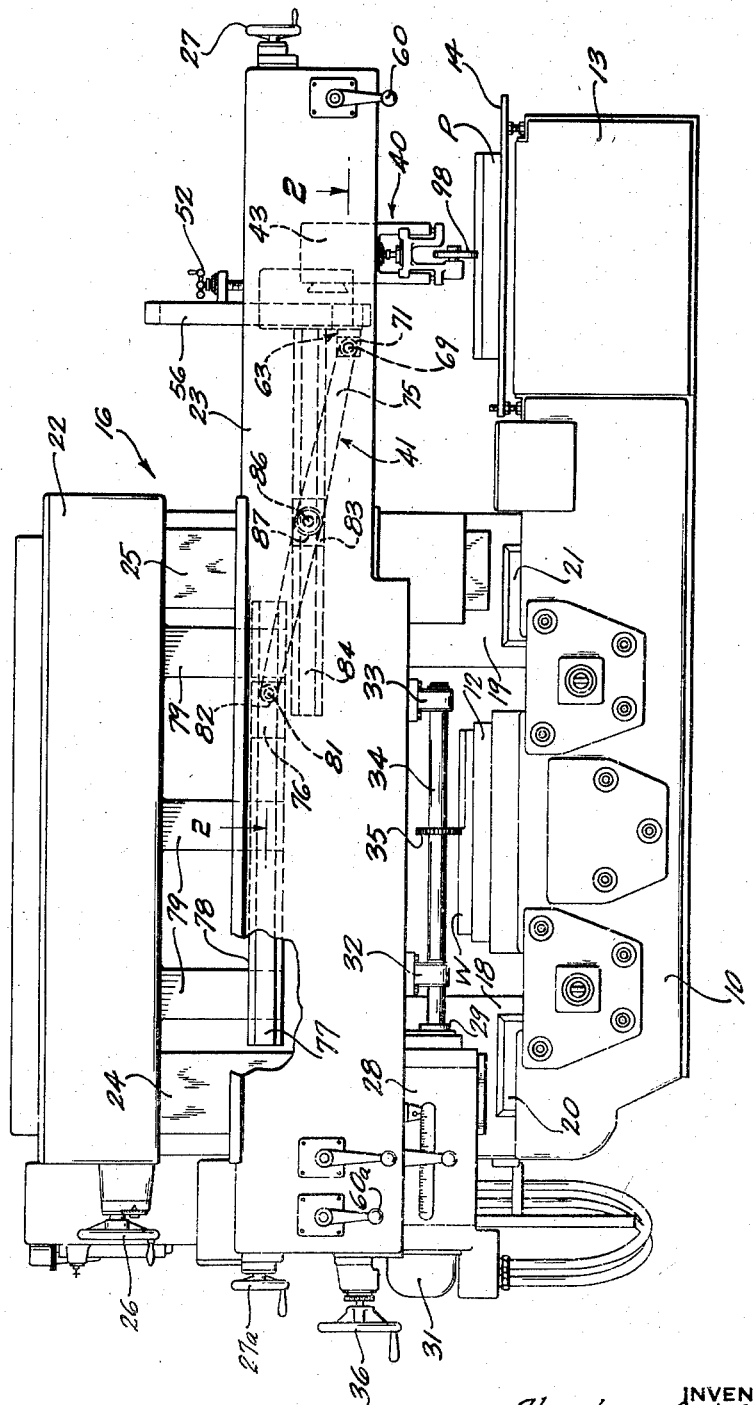

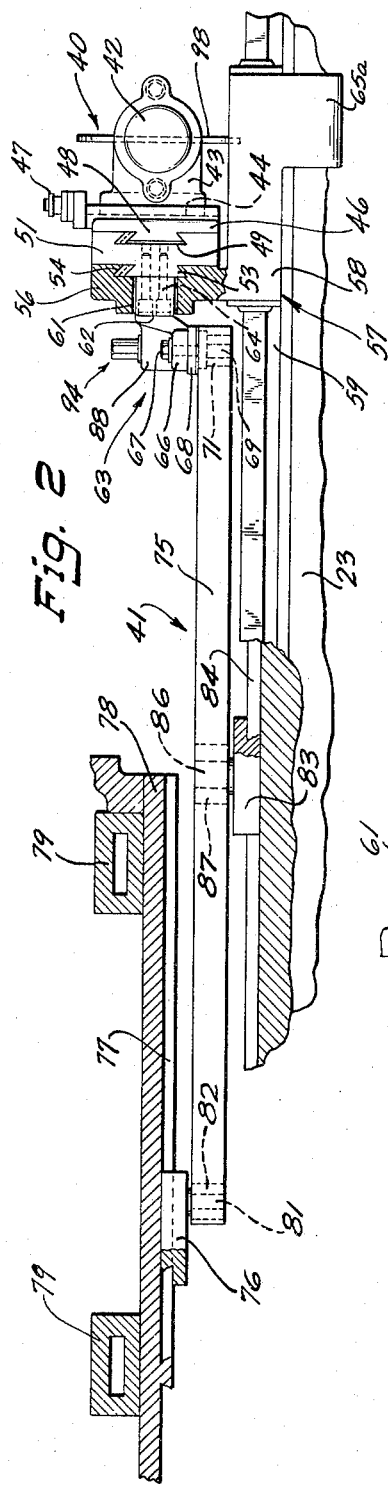
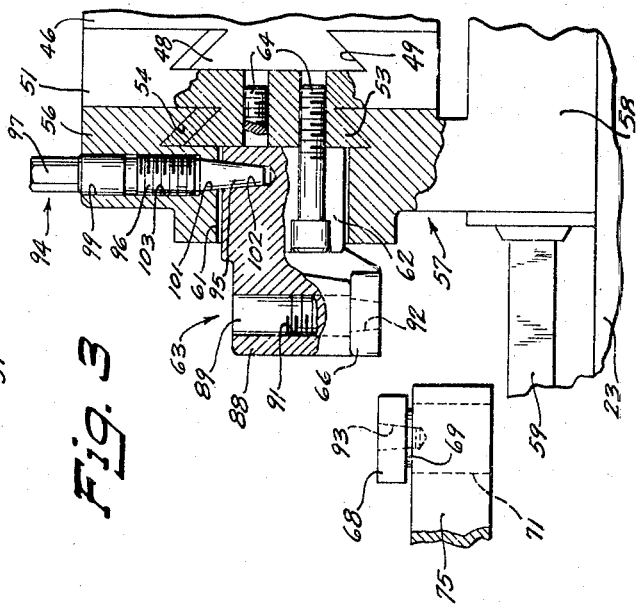
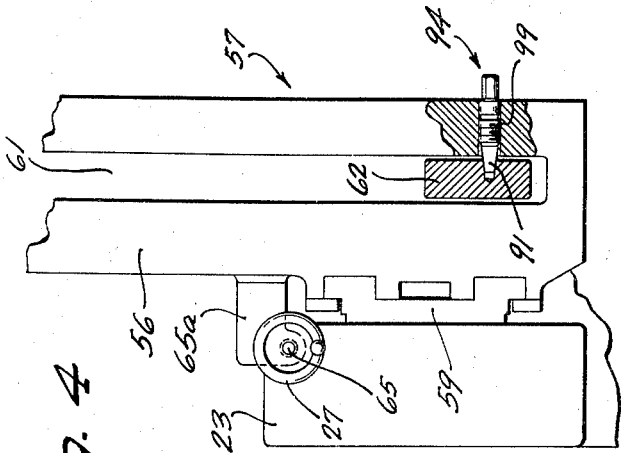
INVENTORS.
Theodore A. Wetzel, &
Joseph R. Roubik
BY
Elroy J. Wutschel
Attorney

United States Patent Office

2,863,362

TRACER MECHANISM

Theodore A. Wetzel and Joseph R. Roubik, Milwaukee, Wis., assignors to Kearney & Trecker Corporation, West Allis, Wis., a corporation of Wisconsin Application November 10, 1955, Serial No. 546,197

5 Claims. (Cl. 90—13.1)

This invention relates generally to machine tools employing tracer mechanisms for reproducing a pattern in a workpiece and more particularly to an improved tracer mechanism mounting especially adapted to increase the accuracy of the reproduction.

A general object of the present invention is to improve the accuracy of reproducing machines in which a pattern is reproduced in a workpiece.

Another object of the present invention is to provide an improved tracer mechanism arrangement for a reproducing machine which will permit the use of an oversize pattern for the purpose of minimizing inaccuracies in the reproduction.

Another object of the invention is to provide an improved linkage between the cutting tool support and the tracer mechanism of a reproducing machine.

Another object of the invention is to provide an improved tracer mechanism mounting that may be connected selectively for movement of the tracer stylus in an amount equal to the movement of the cutting tool or in an amount different than the amount of movement of the cutting tool but in a definite relationship to it.

A further object of the invention is to provide a novel multiplier lever selectively connectable for linking the tracer mechanism of a reproducing machine to the tool support for the purpose of effecting movement of the tracer stylus in an amount that varies from the movement of the cutter in a definite proportion.

According to this invention a machine tool for reproducing a finished workpiece from a pattern is provided with a multiplying mechanism which permits the use of an oversize pattern for producing a desired size workpiece. The machine tool on which this invention has been incorporated is a rail type machine having a rise and fall mechanism on which a cutting tool and a tracer mechanism is supported for reproducing a finished workpiece from a pattern. The multiplying mechanism comprises a bar pivotally secured to a slide device slidably mounted on a fixed member of the machine tool for horizontal movement. The opposite end of the bar is pivotally secured to the tracer mechanism which is slidably mounted on the movable member of the rise and fall mechanism, for free vertical movement. The bar has a third point pivotally connected to another slide device which is slidably supported on the movable member of the rise and fall mechanism for movement in a horizontal plane. In a contouring operation, the stylus of the tracer mechanism in following the contour of a pattern actuates the usual mechanism to move the movable member of the rise and fall mechanism to position the cutting tool to effect a desired milling operation on the workpiece. The rise and fall mechanism in effecting positioning of the cutting tool will also actuate the multiplying bar to effect a greater amount of movement of the tracer mechanism by reason of its connection to the movable member. Therefore, with this invention it is possible to use an oversize pattern to reproduce a desired or normal size finished workpiece. Thus, any pattern error reproduced in the workpiece will be reduced in amount corresponding to the ratio of the size of the pattern to the size of the workpiece.

The foregoing and other objects of this invention, which will be more fully apparent from the following description, may be achieved by means of the exemplifying apparatus shown in and described in connection with the accompanying drawings, in which:

Figure 1 is a view in front elevation of a milling machine in which the present invention has been incorporated;

Fig. 2 is a view in horizontal section taken along the plane represented by the line 2—2 in Fig. 1;

Fig. 3 is an enlarged fragmentary view in horizontal section of the slidable supporting connection between the tracer mechanism and the mounting bracket secured to the rail, showing the tracer mechanism disconnected from the multiplying bar and locked to the bracket; and, Fig. 4 is an enlarged fragmentary end view of the rail showing the supporting bracket mounted on the rail and the locking device for securing the tracer mechanism to the rail.

The particular machine tool set forth herein as illustrative of apparatus embodying the several characteristics of the present invention in a practical form, is a milling machine of the rail type as may best be seen in Fig. 1 of the drawings.

Referring more particularly to the drawings, the milling machine there shown comprises essentially a relatively long hollow bed 10 which constitutes the frame upon which a work supporting table 12 is fixedly mounted and to which a workpiece W is secured.

A bed extension 13 is disposed along one side of the bed 10 and extends parallel to the length of the bed. A pattern supporting table 14 is adjustably mounted on the bed extension 13 for the purpose of receiving a pattern P. A gantry, generally denoted by the reference numeral 16, is movably supported on the bed 10 by shoes 18 and 19 slidable on guideways 20 and 21 longitudinally disposed on each side of the work supporting table 12. The shoes 18 and 19 of the gantry 16 are connected together at the top by a bridge or cross member 22 to form a rigid upstanding structure for supporting a vertically adjustable rail 23. As shown in Fig. 1, the rail 23 extends transversely across the work supporting table 12 and the pattern supporting table 14 and is slidably mounted for vertical movement on guideways 24 and 25 that are carried by the shoes 18 and 19 respectively. The rail 23 is arranged to be vertically adjustable along its supporting guideways by well known screw and nut mechanisms (not shown) actuated simultaneously by an electric motor (not shown) or manually from the left side of the machine, by a handwheel 26 located at the side of the bridge 22 and operatively connected to the screw drive mechanism (not shown).

The rail 23 has mounted on it for horizontal movement, a spindle carrying head 28. The spindle head 28 rotatably supports a horizontal spindle 29 which is connected to be rotated by a spindle motor 31 operably connected to drive the spindle in the usual manner.

A pair of arbor supports 32 and 33 are secured to the bottom surface of the rail 23 to rotatably support an arbor 34 that carries a cutter 35 which is operatively connected to the spindle 29. The spindle head 28 is horizontally adjustable on the rail 23 by means of a handwheel 36 which is secured to the extending end of a traversing screw (not shown) operably connected to actuate the spindle head in horizontal adjustment in a well known manner.

A tracer mechanism, generally denoted at 40, is movably supported on the extending end of the rail 23 in position to engage the pattern P secured to the pattern table 14. The tracer mechanism is adapted to be moved horizontally relative to the rail 23, and is also adapted to be movable vertically with the rail as is the usual practice.

An important feature of this invention resides in the arrangement provided for disconnecting the tracer mechanism from the rail 23 to render it freely movable relative to the rail 23 in order that the mechanism may be connected to a multiplying mechanism 41 for vertical movement in relation to the cutter head. With the use of the multiplier mechanism 41 it is possible to use an oversize pattern P to reproduce a normal or desired size workpiece W. An advantage of the oversize pattern resides in the fact that the errors in the reproducing operation will be reduced in proportion to the ratio that the size of the pattern has to the size of the workpiece. For example, assuming that it is desired to use a pattern that is twice the size of the workpiece, the tracer mechanism 40 in following the contour of the pattern, must move perpendicular in respect to a common fixed plane, an amount that is double the amount that it is necessary for the cutting tool 35 to move. Thus, any errors in the pattern will be reduced by one-half in the finished workpiece, making it possible to reproduce a more accurate workpiece.

To this end, as best seen in Fig. 2, a tracer head 42 is secured to a supporting plate 43 operably disposed for adjustment in a horizontal plane. The supporting plate 43 is provided, on its rear face, with a guide 44 slidably carried in a complementary guideway on the front face of another supporting plate 46 to render the tracer head 42 adjustable horizontally in a direction transverse to the length of the rail 23. Such movement is effected by a micro-screw adjusting mechanism 47 provided to enable the tracer head 42 to be precisely adjusted along the length of the pattern supporting table 14 and with respect to the cutter 35 in a well known manner. The supporting plate 46, in turn, is provided on its rear face with a vertical dovetail guide 48 which is slidably carried in a complementary guideway 49 constructed on the front face of another supporting plate 51 for the purpose of permitting vertical adjustment of the tracer head 42. Such vertical adjustment is effected through a micro-screw adjusting mechanism 52, shown in Fig. 1, which permits of precise vertical adjustment of the tracer head 42 in relation to the pattern table 14 and with respect to the cutter 35, in a well known manner. The supporting plate 51 includes a dovetail guide 53 provided on its rear face which is freely slidable in a vertically disposed complementary guideway 54 constructed on the face of an elongated outwardly extending leg 56 of an L-shaped bracket 57 to form a second slide for permitting vertical movement of the tracer head 42. The base leg 58 of the L-shaped bracket 57 is slidably supported in a horizontally disposed guideway 59 formed on the rear face of the movable rail 23 for rendering the tracer mechanism 40 movable horizontally relative to the rail 23 in a direction parallel to the rail for the purpose of positioning the tracer mechanism in a selected position above the pattern supporting table 14.

The tracer mechanism 40 is manually positionable on the rail 23 by handwheels 27 and 27a fixed to the extending ends of a horizontally mounted screw 65, Fig. 4, disposed longitudinally within the rail 23. The screw 65 is threadedly engaged in a cooperating nut 65a rigidly secured in the base leg 58 of the L-shaped bracket 57 for imparting movement thereto. The L-shaped bracket 57 is locked in the selected position by actuation of either levers 60 or 60a illustrated in Fig. 1, which actuates conventional clamping mechanism (not shown) to effectively lock the base leg 58 of the bracket 57 to the guideway 59.

In order that the tracer mechanism be movable vertically independent of the rail 23, the outwardly extending leg 56 of the L-shaped bracket 57 is provided with an elongated vertical opening 61 which is disposed between the dovetails of the guideway 54. Disposed in the opening 61 for guided vertical movement is a lug 62 of an arm 63. One end of the arm 63 is secured to the supporting plate 51 by means of a plurality of screws 64 inserted through suitable openings in the lug 62 into threaded engagement with the supporting plate 51. The opposite end of the arm 63 is provided with an enlarged end or boss 66 having suitable openings through which screws 67, shown in Fig. 2, are inserted to threadedly engage a pivot block 68. The pivot block 68 has a stub shaft 69, integrally formed with it, which is journalled in an antifriction bearing 71 mounted in the lower end of a motion transmitting member or multiplying bar 75.

The multiplying bar 75 is pivotally connected, at its opposite end, to a slide 76 which is slidably carried for horizontal movement in a guideway 77 formed on the face of a guideway bar 78, as shown in Figs. 1 and 2. The guideway bar 78 is secured to the front faces of a plurality of depending posts 79 which depend from the bottom surface of an over hang of the gantry bridge 22. The slide 76 is provided with a stub shaft 81 which is journalled in an antifriction bearing 82 mounted in the end of the multiplying bar 75 to establish a pivotal connection between the bar 75 and slide 76.

From this construction it is apparent that the guideway bar 78, mounted on the gantry bridge 22 is at a fixed height. Therefore, the slide 76 and the associated end of the multiplying bar 75 will always remain at a fixed vertical height regardless of any horizontal adjusting movement that may be made in the slide 76. The guideway bar 78 has been shown as being secured to the gantry bridge to illustrate a preferred embodiment, however, other structural arrangements may be employed to carry the slide and guideway, if it is found desirable to do so. The important feature of the construction is that the upper end of the bar 75 is horizontally adjustable laterally of the worktable 12 at a fixed vertical height.

The bar 75 is pivotally connected at its mid-point to another slide 83 supported for horizontal movement parallel to the rail 23 in a guideway 84 provided on the rear face of the rail 23. The slide 83 is similar to the slide 76 in that it has a stub shaft 86 journalled in an antifriction bearing 87 mounted in the bar 75. In this manner the slide 83 moves with the rail 23 in a vertical plane while it is free to move independently of the rail in a horizontal plane parallel to the slide 76. As previously stated the right end of the multiplying bar 75, as viewed in Fig. 2, is pivotally connected to the arm 63.

Means have been provided to facilitate aligning the boss 66 of the arm 63 with the pivot block 68 on the right end of the bar 75, prior to the insertion of the screws 67. To this end the boss 66 is provided with an enlarged screw block 88, as best seen in Figs. 2 and 3. The screw block 88 is provided with a bore 89 having a threaded portion 91. The bore 89 at its inner end, adjacent to the pivot block 68, is formed with a taper 92. Likewise, the block 68 is provided with a tapered bore 93, which bore when aligned with the tapered portion 92 of the bore 89 constitutes a continuation thereof. A locating pin 94 is provided with a tapered end 95 which is complementary to the taper of the bore 89 and the bore 93. The mid-portion 96 of the pin 94 is threaded to engage with the threaded portion 91 of the bore 89 upon insertion of the pin in the bore. The outer end 97 of the pin 94 is provided with suitable flats for accommodating a wrench for tightening or removing the pin. To connect the arm 63 with the lower end of the multiplying bar 75 the two members are manually positioned in general alignment. When so aligned, the pin 94 is threaded into engagement with the thread 91 to move the tapered portion 95 inwardly into the tapered bore 93 of the block 68. Thus, accurate positioning of the two members is easily and quickly accomplished. When the members have been aligned the screws 67 are inserted into the boss 66 to threadedly engage the block 68. In this manner the tracer mechanism 40 is pivotally secured to the end of the multiplying bar 75. Since the opposite end of the arm 63 is secured to the freely vertically movable supporting plate 51, as shown in Fig. 2, the tracer mechanism 40 is movable vertically through actuation of the multiplying bar 75.

With the L-shaped bracket 57 clamped to the rail 23 in a selected horizontal position and the tracer head 42 pivotally secured to the multiplying bar 75 and positioned so as to have its follower roller or stylus 98 in contact with the double size pattern P; and when the rail 23 is positioned to bring the cutter 35 into cutting engagement with the single size workpiece W, the machine is put in operation to move the gantry 16 longitudinally of the bed 10. The follower roller 98, of the tracer, in following the contour of the pattern P will signal for movement of the rail 23, to position the cutter 35 in a desired cutting engagement with the workpiece W, either upwardly or downwardly depending upon the variation in the pattern.

Assuming that the follower roller 98 of the tracer is following the contour of the pattern in a downward direction, the tracer mechanism in keeping the follower roller in contact with the pattern will signal for downward movement of the rail 23. The rail will be caused to move downwardly to maintain the cutter in proper cutting engagement with the workpiece. As the rail 23 moves downwardly the slide 83 pivotally connected to the midpoint of the bar 75 will move with the rail. Since the right end of the bar 75 as viewed in Fig. 2 is pivotally secured to the tracer mechanism and the tracer mechanism is restrained from moving horizontally, the slides 76 and 83 will adjust themselves in a horizontal plane to accommodate movement of the right end of the multiplying bar 75 in the vertical plane. As the slide 83 moves downwardly with the rail, and as the slide 76 is maintained at a fixed vertical height, it is apparent that both the tracer mechanism 40 and the cutter 35 will move downwardly with the rail 23 while the bar 75 will move the tracer mechanism 40 downwardly an equal amount relative to the rail so that the tracer mechanism 40 will travel downwardly twice the distance that the cutter 35 does. The multiplying bar 75 will function in the same manner during an upward movement of the rail 23 to effect an upward movement of the tracer mechanism 40 relative to the rail 23 so that the tracer mechanism will move upwardly twice the distance of the upward movement of the cutter 35.

As herein shown and described the tracer mechanism 40 establishes the amount of movement desired, while the rail effects the desired positioning of the cutter. The multiplying bar in cooperation with the rail 23 effects a multiple movement of the tracer mechanism with respect to rail movement for a continuous contact of the follower roller 98 with the pattern P. The multiplying bar permits the use of an oversize pattern to produce a more accurate single size workpiece. Thus, the arrangement results in a reduction of any error occurring in the reproducing operation.

Provision has also been made for disconnecting the multiplying bar 75 from the tracer mechanism 40 so that the latter may move unitarily with the rail in the conventional manner. To this end, operative means are provided for connecting the tracer mechanism for movement with the rail 23. As seen in Fig. 3, the outwardly extending leg 56 of the L-shaped bracket 57 is provided with a horizontal longitudinal bore 99 which is disposed toward the bottom of the opening 61, as best seen in Fig. 4. The inner portion of the bore 99 is formed with a complementary taper 101 to accommodate the tapered portion 95 of the pin 94. The lug 62 of the arm 63 is also provided with a tapered bore 102 which in effect is a continuation of the tapered portion 101 of the bore 99. The mid-portion 103 of the bore 99 is provided with a thread to receive the threaded portion 96 of the pin 94.

In arranging the tracer mechanism for operation with the rail all that is necessary, is to remove the pin 94 from its position in the screw block 88 of the lever arm 63 and remove the screws 67 to disconnect the boss 66 and the pivot block 68. This frees the bar 75 from the tracer mechanism 40. The bar 75 may then be moved inwardly on the rail in an out of the way position to prevent the various members from interfering with each other. The tapered bores 102 and 101, of the lug 62 and the leg 56 respectively, are aligned and the pin 94 is then threaded into the bore 99 to engage its tapered portion 95 with the tapered bores 101 and 102 to thereby lock the lug 63 and the L-shaped bracket 57 together. Since the L-shaped bracket 57 is secured to the rail 23, the tracer mechanism will move vertically with the rail in the usual manner. With the tracer mechanism connected in this manner the reproduction in the workpiece will be the same size as the pattern P. Therefore, assuming that the follower roller 98 of the tracer mechanism 40 is following the pattern P in a downward path, the tracer mechanism 40 will cause a similar downward movement of the rail 23. When the rail moves downwardly, the tracer mechanism 40, now connected to the rail by means of the pin 94 locking the lug 62 of the lever arm 63 to the L-shaped bracket 57, moves with the rail the same amount that the cutter 35 is moved.

From the foregoing explanation of the operation of the illustrated embodiment of the invention, it is apparent that there has been provided an improved apparatus capable of being attached to or constructed with a machine tool employing tracer mechanisms, for increasing the accuracy of a finished workpiece produced from an oversize pattern. It is also apparent that the apparatus is easily and simply disconnected from the tracer mechanism to permit the tracer mechanism to be used in the conventional manner.

Although the particular embodiment of the invention has been set forth in detail for the purpose of fully explaining its mode of operation, it is to be understood that the structure shown and described is intended to be illustrative only and that various features of the invention may be otherwise utilized without departing from the spirit and scope of the invention as defined in the subjoined claims.

The principles of this invention having now been fully explained in connection with the foregoing description, we hereby claim as our invention:

1. In an automatic pattern controlled machine tool; a frame; a movable member supported by said frame; a cutter operably carried by said movable member for bodily movement with it in position to operate upon a workpiece on said frame; a tracer mechanism slidably supported by said movable member for movement in the same direction as the movement of said movable member; a follower carried by said tracer mechanism in position to engage the pattern and connected to control the movement of said movable member in accordance with the contour of the pattern to thereby effect movement of said cutter relative to the workpiece so that said cutter will reproduce the pattern in the workpiece; a first slide slidably supported by said movable member for movement relative to said movable member in the plane of movement of said movable member but in a different direction; a second slide slidably supported by said frame for movement in a path of travel parallel to the path of travel of said first slide; and a bar pivotally connected at one end to said tracer mechanism and at its opposite end to said second slide, said bar being also pivotally connected at a point intermediate its ends to said first slide; whereby said tracer mechanism will move with said movable member in response to the contour of the pattern as detected by said follower, and said bar will also cause a proportional movement of said tracer mechanism relative to said movable member in the same direction as the movement of said movable member so that the reproduction in the workpiece will differ from the pattern in size.

2. In an automatic pattern controlled machine tool; a frame; a movable member slidably supported by said frame; a cutter operably carried by said movable member for bodily movement with it in position to operate upon a workpiece on said frame; a tracer mechanism slidably supported by said movable member for movement relative to said movable member in the same direction as the path of travel of said movable member; a stylus carried by said tracer mechanism in position to engage the pattern and connected to control the movement of said movable member in accordance with the contour of the pattern to thereby effect movement of said cutter relative to the workpiece so that said cutter will reproduce the pattern in the workpiece; connecting means slidably supported by said movable member for movement in the plane of movement of said movable member but in a different direction; and a linking bar having one end pivotally connected to said tracer mechanism and its opposite end pivotally and slidably connected to said frame so that the end of said bar is slidable relative to said frame in a path of travel parallel to the path of travel of said connecting means, said linking bar being also pivotally connected to said connecting means at a point intermediate its ends; whereby said tracer mechanism will move with said movable member in response to the contour of the pattern as detected by said stylus, and said linking bar will also cause a proportional movement of said tracer mechanism relative to said movable member in the same direction as to the movement of said movable member so that the reproduction in the workpiece will differ from the pattern in size.

3. In an automatic pattern controlled machine tool; a frame; a movable member supported by said frame; a cutter operably carried by said movable member for bodily movement with it in position to operate upon a workpiece on said frame; a tracer mechanism slidably supported by said movable member for movement in the direction of movement of said movable member; a stylus carried by said tracer mechanism in position to engage the pattern and connected to control the movement of said movable member in accordance with the contour of the pattern to thereby effect movement of said cutter relative to the workpiece so that said cutter will reproduce the pattern in the workpiece; and a linking bar pivotally connected at one end to said tracer mechanism and its opposite end pivotally and slidably connected to said frame so that the end of said bar is slidable on said frame in a direction transverse to the direction of movement of said movable member and pivotable relative to said frame, said linking bar being also pivotally and slidably connected at a point intermediate its ends to said movable member so that the intermediate point of said linking bar is slidable along said movable member in a direction transverse to the direction of movement of said movable member and said linking bar is pivotable about its intermediate point relative to said movable member; whereby said tracer mechanism will move with said movable member in response to the contour of the pattern as detected by said stylus, and said linking bar will also cause a proportional movement of said tracer mechanism relative to said movable member in the same direction as the movement of said movable member so that the reproduction in the workpiece will differ from the pattern in size.

4. In a movement multiplying apparatus for a machine tool; a frame; a movable member supported by said frame; a cutter operably carried by said movable member for bodily movement with it in position to operate upon a workpiece on said frame; a tracer mechanism slidably supported on said movable member in position to engage a pattern on said frame and connected to control the movement of said movable member in accordance with the contour of the pattern to thereby effect movement of the cutter relative to the workpiece so that it may reproduce the pattern in the workpiece; a first slide slidably supported on said movable member for movement relative to said movable member in the plane of movement of said movable member but in a different direction; a second slide slidably supported on said frame for movement parallel to the path of travel of said first slide; a bar having one end pivotally connected to said second slide and having its opposite end releasably pivotally connected to said tracer mechanism, said bar also being pivotally connected at a point intermediate of its ends to said first slide; and means operable to lock said tracer mechanism to said movable member when said pivotal connection between said bar and said tracer mechanism has been released; whereby said tracer mechanism will move with said movable member in response to the contour of the pattern, and its connection to said bar will cause said tracer mechanism to move an additional amount relative to the movable member in the same direction by the operation of said bar.

5. In an automatic pattern controlled machine tool; a frame; a movable member supported by said frame; a cutter operably carried by said movable member for bodily movement with it in position to operate upon a workpiece on said frame; a tracer mechanism slidably supported by said movable member; a stylus carried by said tracer mechanism in position to engage the pattern and connected to control the movement of said movable member in accordance with the contour of the pattern to thereby effect movement of said cutter relative to the workpiece so that said cutter will reproduce the pattern in the workpiece; and a bar operably connected at one end to said tracer mechanism and at its opposite end to said frame with an intermediate point of said bar being operably connected to said movable member so that movement of said movable member will effect a movement of said tracer mechanism relative to said movable member; whereby said tracer mechanism will move with said movable member in response to the contour of the pattern as detected by said stylus, and said bar will effect an additional movement of said tracer mechanism relative to said movable member so that the reproduction in the workpiece will differ from the pattern in size.

References Cited in the file of this patent

UNITED STATES PATENTS

| 1,486,814 | Townsend | Mar. 11, 1924 |
| 2,714,254 | Andrews et al. | Aug. 2, 1955 |
| 2,753,764 | Stephenson | July 10, 1956 |

FOREIGN PATENTS

| 1,104,053 | France | June 8, 1955 |